UNITED STATES PATENT OFFICE 2,464,172

ESTERS OF 5-TERTIARYBUTYLSALICYLIC ACID

Edgar C. Britton and Ezra Monroe, Midland, Mich., assignors to The Dow Chemical Company, Midland, Mich., a corporation of Delaware No Drawing. Application August 23, 1947, Serial No. 770,326

4 Claims. (Cl. 260—473)

This invention relates to novel esters of 5-tertiarybutylsalicylic acid having the general formula

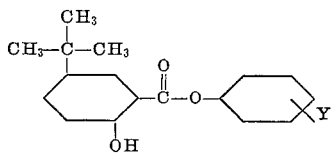

where Y is a member of the group consisting of tertiaryalkyl, aryl, and halogen.

Representative members of this class of compounds have been prepared and identified, and found valuable as intestinal antiseptics and for other medicinal uses. They are also useful as modifying agents for vinylidene chloride polymers and copolymers, nitrocellulose, cellulose acetate and cellulose esters. The compounds are substantially non-volatile at room temperature, readily soluble in the solvents and solvent mixtures commonly employed for dissolving cellulose derivatives, and stable to light.

The new esters may be prepared by any of the conventional esterification methods. One satisfactory procedure comprises heating 5-tertiarybutylsalicylic acid with a molecular equivalent of a tertiaryalkyl-, aryl-, or monohalophenol to a temperature above 100° C. and preferably to a temperature between about 120° C. and about 150° C., in the presence of phosphorus oxychloride. The mixture is stirred during the reaction period. The esterification is usually complete in from about 1 to 5 hours, although a longer period may sometimes be required. Upon substantial completion of the reaction, the crude product is treated with sufficient aqueous alkali to neutralize unreacted acid therein. The oily product of reaction is thereafter separated as by decantation, and purified either by fractional distillation under vacuum or by crystallization from a suitable solvent such as chlorobenzene, alcohol, or mixtures thereof.

The following examples illustrate the invention but are not to be construed as limiting.

Example 1

98.5 grams (0.5 mol) of 5-tertiarybutylsalicylic acid, melting at 154° C., and 75 grams (0.5 mol) of 4-tertiarybutylphenol were placed in a three-neck glass flask equipped with a stirrer, thermometer, condenser, and dropping funnel. The flask was heated in an oil bath until the temperature of the reaction mixture was 110° C. 42 grams (0.27 mol) of phosphorus oxychloride was then slowly added through the dropping funnel while continuously stirring the mixture. Copious fumes of hydrochloric acid were evolved during the reaction. The mixture was stirred and heated at 110°–125° C. for two hours, and thereafter poured into water. This crude aqueous mixture was extracted with 300 milliliters of benzene. The benzene extract was separated, washed successively with dilute aqueous sodium carbonate and water, dried, and the benzene recovered by distillation. The residue, consisting of 38 grams of crude product, was recrystallized from a mixture of two parts chlorobenzene and one part ethyl alcohol. 26 grams of 4-tertiarybutylphenyl 5-tertiarybutylsalicylate was thereby obtained as white crystals melting at approximately 155° C. and having the formula

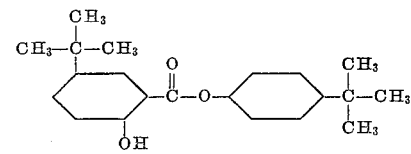

Example 2

In a similar manner 4-tertiaryamylphenol was reacted with 5-tertiarybutylsalicylic acid to obtain 4-tertiaryamylphenyl 5-tertiarybutylsalicylate as a white crystalline solid melting at 105°–107° C. and having the formula

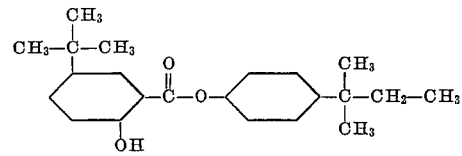

Example 3

4-chlorophenol was reacted with 5-tertiarybutylsalicylic acid substantially as described in Example 1 to obtain 4-chlorophenyl 5-tertiarybutylsalicylate as a white crystalline solid melting at 68°–70° C. and having the formula

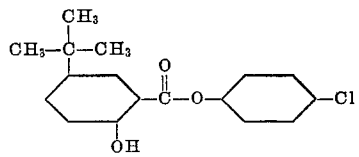

Example 4

Similarly 4-xenol (4-hydroxy-diphenyl) was reacted with 5-tertiarybutylsalicylic acid to obtain 5-xenyl 5-tertiarybutylsalicylate as a white crystalline solid melting at 162°–165° C. and having the formula

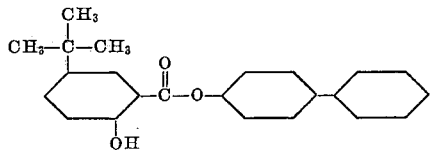

In like manner, 5-tertiarybutylsalicylic acid may be reacted with other phenols according to the herein described procedure. Representative of the compounds so obtained are 4-bromophenyl 5-tertiarybutylsalicylate, 4-iodophenyl 5-tertiarybutylsalicylate, 2-xenyl 5-tertiarybutylsalicylate, 3-xenyl 5-tertiarybutylsalicylate, 4-tertiaryoctylphenyl 5-tertiarybutylsalicylate, 2-tertiarybutylphenyl 5-tertiarybutylsalicylate, 2-chlorophenyl 5-tertiarybutylsalicylate and 3-chlorophenyl 5-tertiarybutylsalicylate.

The present application is a continuation-in-part of a co-pending application, Serial No. 438,439, filed April 10, 1942, which has become abandoned.

We claim:

1. An ester of 5-tertiarybutylsalicylic acid having the formula

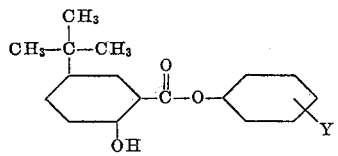

wherein Y is a member of the group consisting of tertiaryalkyl, phenyl and chlorine.

2. 4-tertiarybutylphenyl 5-tertiarybutylsalicylate, a white crystalline solid having a melting point of approximately 155° C. and the formula

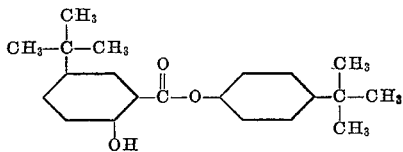

3. 4-chlorophenyl 5-tertiarybutylsalicylate, a white crystalline solid having a melting point of 68°–70° C. and the formula

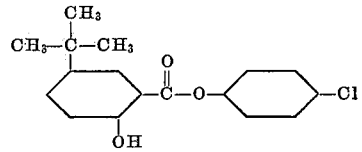

4. 4-xenyl-5-tertiarybutylsalicylate, a white crystalline solid having a melting point of 162°–165° C. and the formula

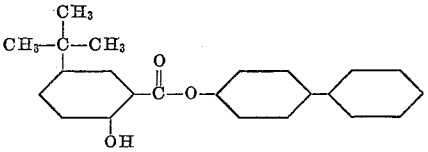

EDGAR C. BRITTON.
EZRA MONROE.

REFERENCES CITED

The following references are of record in the file of this patent:

UNITED STATES PATENTS

| Number | Name | Date |
|---|---|---|
| 1,856,880 | Mills et al. | May 3, 1932 |
| 2,128,902 | Bass et al. | Sept. 6, 1938 |
| 2,392,361 | Britton et al. | Jan. 8, 1946 |

FOREIGN PATENTS

| Number | Country | Date |
|---|---|---|
| 68,111 | Germany | Mar. 22, 1893 |
| 70,519 | Germany | July 25, 1893 |

OTHER REFERENCES

Dobrzyski, "Journ. für Praktische Chemie" (2), vol. 36, page 396 (1887).

Meyer et al., "Monatshifte für Chemie," vols. 53 and 54, pages 721–752 (1929).